Jan. 12, 1926.
L. W. WATERS
WINDSHIELD WIPER
Filed Dec. 3, 1924
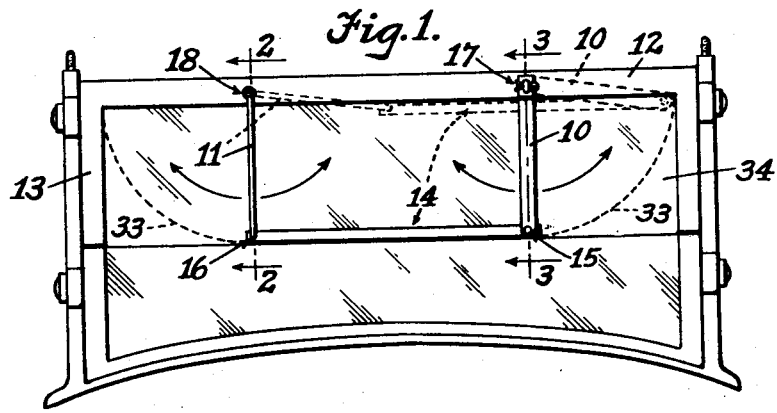
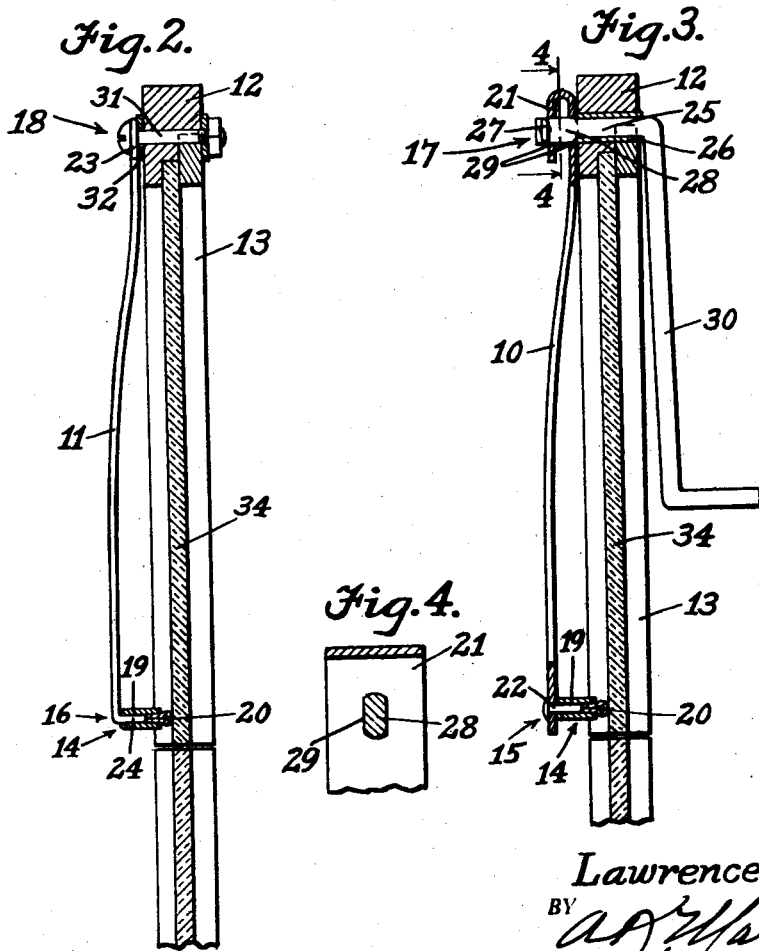
INVENTOR,
Lawrence W. Waters
BY
ATTORNEY.

Patented Jan. 12, 1926.

1,569,412

UNITED STATES PATENT OFFICE.

LAWRENCE W. WATERS, OF LOS ANGELES, CALIFORNIA.

WINDSHIELD WIPER.

Application filed December 3, 1924. Serial No. 753,586.

*To all whom it may concern:*

Be it known that I, LAWRENCE W. WATERS, a citizen of the United States, residing at Los Angeles, in the county of Los Angeles and State of California, have invented new and useful Improvements in Windshield Wipers, of which the following is a specification.

My invention relates to cleaning devices for windshields and more particularly to a device for wiping the upper glass in a windshield.

It is well known that in misty or foggy weather moisture accumulates on the front or outer side of windshields to such an extent as to obscure the driver's view of the road. Likewise in dry weather dust may accumulate on the windshield with a like result.

The main object of my invention is to provide a wiping device which may be operated to sweep over the front side of the windshield and remove any such accumulated moisture or dust.

Another object is to provide a windshield wiper of the character described which may be operated at will by the auto driver from his position at the steering wheel and which may be folded out of the way when not in use.

Other objects and advantages will appear hereinafter and while I show herewith and will describe a preferred form of construction I desire it to be understood that I do not confine my invention to such preferred form but that various changes and adaptations may be made therein without departing from the spirit of my invention as hereinafter claimed.

Referring to the drawings which accompany this specification and form a part thereof:

Fig. 1 is a front view of a windshield having a wiper embodying the principles of my invention attached thereto.

Fig. 2 is an enlarged sectional view of the upper part of the windshield showing the position and operating parts of my wiper, the section being taken on line 2—2 of Fig. 1.

Fig. 3 is a similar sectional view taken on line 3—3 of Fig. 1.

Fig. 4 is a sectional view of the crank shaft of my wiper taken on line 4—4 of Fig. 3.

As indicated more in detail by the reference numerals, a pair of arms 10 and 11 are pivotally mounted on the top rail 12 of the windshield frame 13 and a wiper member or squeegee 14 extending between the lower ends of arms 10 and 11 has its ends pivotally attached thereto. The arms are of equal length and the pivot points 15 and 16 of the squeegee and arm connections are equally spaced with pivot points 17 and 18 of the arm attachments to top rail 12, so that arms 10 and 11 are parallel in all positions throughout their movement and wiper member 14 is maintained parallel to top rail 12 throughout its movement.

The wiper or squeegee 14 is of the usual construction, the back piece 19 being formed of sheet metal bent longitudinally so as to form a U-shaped channel, between the edges of which are clamped the edges of a soft rubber sheet folded longitudinally to form a wiping edge or face 20.

The operating arm 10 is preferably made of tempered band steel with a return bend 21 on its upper end and a pivot pin 22 extending through its lower end and through a hole in back piece 19 adjacent to one of its ends.

Arm 11 is preferably made of tempered steel wire with a loop or eye 23 on its upper end and a right angled bend 24 serving as a pivot pin on its lower end, which extends through a hole in back piece 19 adjacent to its other end. The arms are sufficiently tempered to provide a degree of resiliency for holding the wiper member pressed against the glass in the upper section of the windshield.

A stub shaft 25, turning in a bearing sleeve 26, which extends through the rail 12, serves as a pivot for arm 10, the latter being held thereon by a cotter pin 27. In order to prevent arm 10 from turning on shaft 25, the outer end 28 of the latter is flattened and elongated apertures 29 are made in the former to fit thereon.

A crank 30, made integral with stub shaft 25 or fixed on the inner end thereof, is adapted to be turned from side to side by the driver through an angle of approximately 180°, whereby arm 10 is swung through a corresponding angle.

A bolt 31 extending through eye 23 of arm 11 and through cross bar 12 holds the arm in place and serves as pivot 18 thereof.

A washer 32 is placed between eye 23 and rail 12 to lessen friction.

The operation of the wiper is evident. When the crank is turned in either direction arm 10 swings with it, and arm 11, connected thereto by squeegee 14, swings through an equal angle, squeegee 14 being held parallel to rail 12 by the two arms and being caused to sweep over the entire surface of the glass 34 in the upper section of the windshield, excepting the small triangular spaces in the lower part thereof, the limits of which are indicated by dotted lines 33.

When not in use the wiper may be swung to either side and allowed to remain in the position shown in dotted lines. It is held in such folded position by friction between one of the arms 10 or 11 and back piece 19 of the squeegee.

In this folded position the wiper is scarcely visible on the outer side and the crank is out of the way on the inner side of the windshield.

Having thus illustrated and described my invention, I claim:

1. In a wiper for a windshield, a swinging arm, means to operatively connect the free end of said arm with the wiper element, the other end of said arm being provided with a return bend, a stub shaft extending through both sides of said bend in fixed relation thereto, and operating means for said stub shaft.

2. In a wiper for a windshield a swinging arm, means to operatively connect the free end of said arm with the wiper element, the other end of said arm being provided with a return bend, said bend having aligned elongated apertures therethrough, a stub shaft having a flattened portion extending through and fitted within said elongated apertures, and operating means for said stub shaft.

LAWRENCE W. WATERS.